US010572688B2

(12) United States Patent
Asati et al.

(10) Patent No.: US 10,572,688 B2
(45) Date of Patent: Feb. 25, 2020

(54) BLOCKCHAIN BASED SOFTWARE LICENSING ENFORCEMENT

(71) Applicant: Cisco Technology, Inc., San Jose, CA (US)

(72) Inventors: Rajiv Asati, Morrisville, NC (US); Nagendra Kumar Nainar, Morrisville, NC (US); Carlos M. Pignataro, Raleigh, NC (US); Justin J. Muller, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 305 days.

(21) Appl. No.: 15/482,036

(22) Filed: Apr. 7, 2017

(65) Prior Publication Data
US 2018/0293363 A1 Oct. 11, 2018

(51) Int. Cl.
*G06F 21/64* (2013.01)
*G06F 21/12* (2013.01)
*G06F 21/10* (2013.01)

(52) U.S. Cl.
CPC ............ *G06F 21/64* (2013.01); *G06F 21/10* (2013.01); *G06F 21/12* (2013.01)

(58) Field of Classification Search
USPC .......... 726/31, 2, 21, 36; 713/150, 163, 181; 380/255, 264, 276
See application file for complete search history.

(56) References Cited

U.S. PATENT DOCUMENTS

| | | | |
|---|---|---|---|
| 8,523,657 B2* | 9/2013 | Michaelson | G07F 17/3225 463/16 |
| 9,523,657 B2* | 12/2016 | Wu | G01N 27/622 |
| 9,553,982 B2* | 1/2017 | Unitt | H04L 63/08 |
| 2006/0116966 A1* | 6/2006 | Pedersen | G06F 21/10 705/59 |
| 2016/0098723 A1* | 4/2016 | Feeney | G06Q 20/4016 705/75 |

(Continued)

FOREIGN PATENT DOCUMENTS

WO 2016/128491 A1 8/2016

OTHER PUBLICATIONS

J. Herbert, et al., "A Novel Method for Decentralised Peer-to-Peer Software License Validation Using Cryptocurrency Blockchain Technology", Proceedings of the 38th Australasian Computer Science Conference (ACSC 2015), Australia, Jan. 27-30, 2015, 9 Pages.

(Continued)

*Primary Examiner* — Sharif E Ullah
(74) *Attorney, Agent, or Firm* — Edell, Shapiro & Finnan, LLC (57) ABSTRACT

A server compiles a software program with a randomly generated string to produce compiled code. The server also computes a hash of the compiled code to produce a unique identifier for the software program. Upon receiving a request from a user to download the software program, the server generates a transaction for a blockchain that has a transaction identifier and the transaction including a user identifier for the user and the unique identifier. The server embeds the transaction identifier and the unique identifier with the software program, and downloads the software program to a computing device associated with the user.

20 Claims, 6 Drawing Sheets

(56) References Cited

U.S. PATENT DOCUMENTS

| | | | | |
|---|---|---|---|---|
| 2016/0217436 A1* | 7/2016 | Brama | ............... | G06Q 20/06 |
| 2016/0261690 A1* | 9/2016 | Ford | ............... | H04L 67/1044 |
| 2016/0275461 A1* | 9/2016 | Sprague | ............ | G06Q 20/0655 |
| 2016/0283920 A1* | 9/2016 | Fisher | ............... | G06Q 20/02 |
| 2016/0292672 A1* | 10/2016 | Fay | ............... | G06Q 20/363 |
| 2016/0321654 A1* | 11/2016 | Lesavich | ............ | G06F 21/6245 |
| 2016/0358158 A1* | 12/2016 | Radocchia | ........... | G07G 1/0081 |
| 2018/0053161 A1* | 2/2018 | Bordash | ............. | G06Q 20/102 |

OTHER PUBLICATIONS

Michael Crosby et al., "BlockChain Technology", Oct. 16, 2015, 35 pages.

* cited by examiner

BLOCKCHAIN BASED SOFTWARE LICENSING ENFORCEMENT

TECHNICAL FIELD

The present disclosure relates to software licensing enforcement.

BACKGROUND

Vendors of computing and network equipment have been faced with challenges in controlling and handling the usage of devices (i.e. hardware or/and software) in customer environments. While software licensing has been typically used to address these challenges, it is difficult to monitor and control the usage of same software more than the allowed number of instances or set of features or time duration, or the integrity of the legitimate users.

Software licensing faces problems to implement and enforce. Additionally, as network functions become more virtualized (e.g. selling only network device software), it becomes more important to streamline the software licensing.

DESCRIPTION OF EXAMPLE EMBODIMENTS

Overview

In one embodiment, a server compiles a software program with a randomly generated string to produce compiled code. The server also computes a hash of the compiled code to produce a unique identifier for the software program. Upon receiving a request from a user to download the software program, the server generates a blockchain transaction that has a transaction identifier and the transaction including a user identifier for the user and the unique identifier. The server embeds the transaction identifier and the unique identifier with the software program, and downloads the software program to a computing device associated with the user.

DETAILED DESCRIPTION

Systems and methods are presented herein to monitor downloads of software. There are electronic vendors who can download the software once and use it as many times (on as many computing devices) as possible without necessarily paying for it.

Presented herein is an approach that leverages blockchain technology to tackle these challenges. A single or multiple user/device validation approach is used by leveraging details uploaded into a blockchain ledger. One use of the blockchain in this approach is for verification when the device boots up or a periodic verification. Another use is for identification of any illegitimate transactions.

Figure 1A:
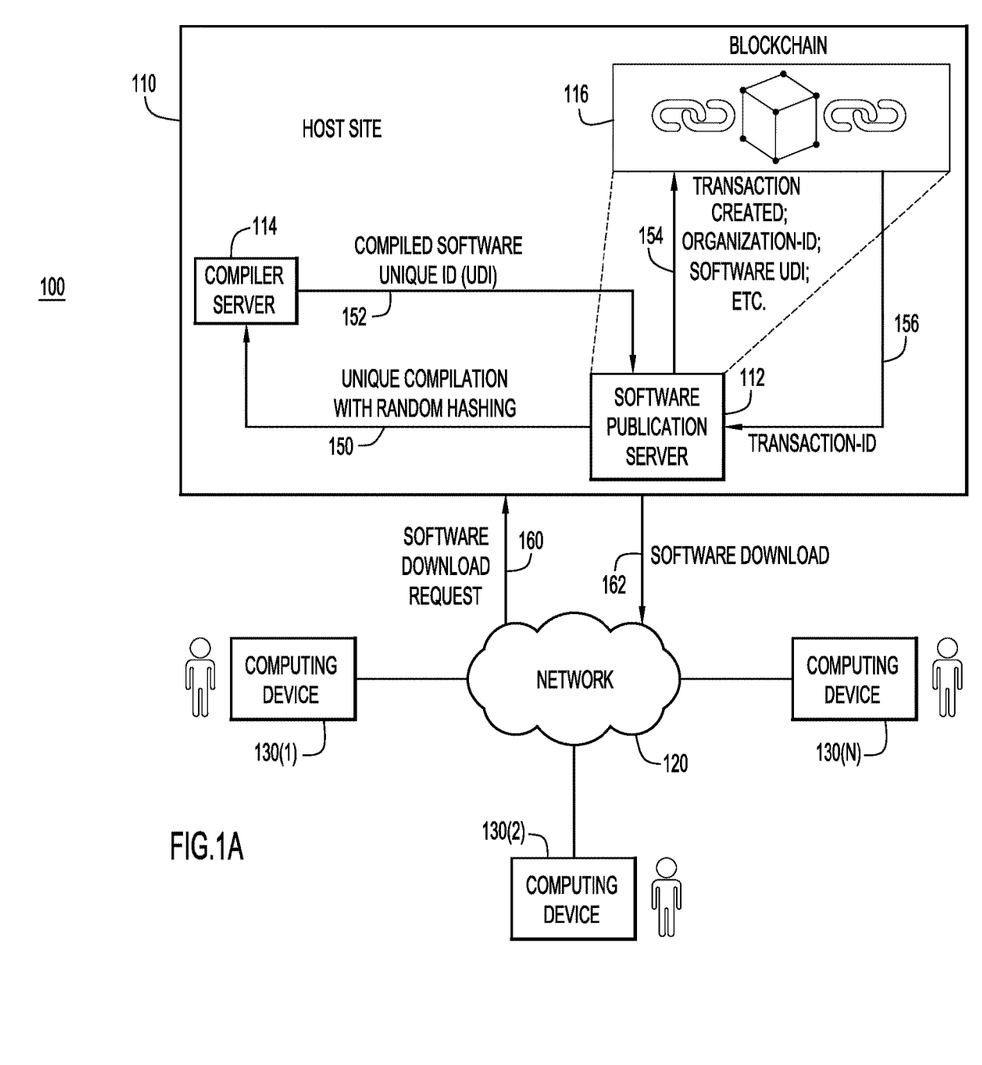
FIGS. 1A and 1B are diagrams of a system and operational flow to track usage of software using a blockchain, according to an example embodiment.

Reference is first made to FIG. 1A. FIG. 1A shows a system 100 that includes a vendor datacenter or host site 110, a network 120 and a plurality of computing devices 130(1)-130(N) that use software for operation. The datacenter 110 includes a software publication server 112 and a compiler server 114. The software publication server 112 manages the creation and updating of a blockchain for each instance/copy of licensed software. A blockchain is pictorially represented at reference numeral 116. The functions of the software publication server 112 and the compiler server 114 may be integrated in one server/entity.

The computing devices 130(1)-130(N) may be any type of device that is capable of executing software for one or more of its operations. In one example embodiment, the computing devices 130(1)-130(N) may be network devices. More specifically, the computing devices 130(1)-130(N) may be network devices that employ network function virtualization (NFV), also known as virtual network functions (VNFs).

In an NFV environment, a VNF handles specific network functions that run on one or more virtual machines (VMs) on top of the hardware networking infrastructure in routers, switches, gateways, firewalls, etc. Individual virtual network functions can be connected or combined together as building blocks to offer a full-scale networking communication service.

NFV is an architectural approach that focuses on decoupling individual services such as network address translation (NAT), access control lists (ACL), quality of service (QoS), Layer 3 routing, intrusion prevention and intrusion detection systems (IPS and IDS), etc., from the underlying hardware platform. Allowing such functions to run inside virtual machines, on top of standard x86 hardware resources, increases the deployment flexibility in the network.

In one example NFV architecture, an orchestration environment allows automation of the deployment of virtualized network services, consisting of multiple virtualized network functions. The VNFs provide the desired network functionality, or even non-networking software applications, at a deployment location. A Network Functions Virtualization Infrastructure Software (NFVIS) platform facilitates the deployment and operation of VNFs and hardware components. X-86-based compute resources to provide the CPU, memory, and storage required to deploy and operate VNFs and run applications.

Blockchain technology is leveraged to provide a unique way of identifying the user/owner, and a unique way of identifying the device (hardware and/or software). In the case of identifying the user, one method is to issue each user a personal private key file. The user is incentivized to keep this key private because anyone with the key could assume ownership of the associated device. The key itself can be stored either with the customer, or stored by the software vendor or a vendor partner as a service to the customer.

As shown in FIG. 1A, to uniquely identify the software, at 150 the compiler server 114 compiles the software program with a string that is either randomized at the time the software program is compiled or set to a particular customer context. After compiling, a hash is taken of the resulting code, which creates a unique identifier (UDI) for that piece/copy of software. This means that every single copy of software is recompiled for every customer each time it is downloaded. This also means that each copy of software is completely unique (based on the UDI) and ultimately monitorable, as shown at 152.

At 154, the software publication server 112 takes this compiled software UDI to encode a transaction identifier (transaction-ID) associated with a blockchain 116 and use it for validation of the software. The initial transaction within a block of the blockchain includes an organization identifier (organization-ID) of the entity/business enterprise of which the user is a part, along with the software UDI. Upon further software use, a transaction-ID is included in the running software instance for subsequent validation. A transaction-ID is generated for each transaction associated with the blockchain 116, as shown at 156.

Still referring to FIG. 1A, at 160, a user (associated with one of the computing devices 130(1)-130(N)) sends a software download request to the software publication server. The user is permitted to download the software using a registered account. The registered account has associated with it organization related information and a private key. The user can choose a licensing level, such as demonstration/evaluation or full production usage. In case of full production usage, the user selects one or more features of the software to be used, number of instances (copies of the software) allowed, and a time-period for which the software usage would be valid once activated (at device booted up). If the user has previously downloaded the software as demonstration/evaluation, then the user could be given an option to convert to a full production usage license.

Next, the software publication server 112 updates the blockchain ledger with the user-ID, organization-ID, a descriptor of the software program, e.g. csr1000v-universalk9.03.15.00.S.155-2.S-std.ova, production-usage flag, number of licensed devices (number of allowed copies of the software), etc. and the corresponding transaction-ID of the created block. At 162, all of this information is included in a record of the blockchain. Also, embedded in the downloaded software are the transaction-ID and the software UDI. The software may be compiled so as to include the transaction-ID and the software UDI embedded therein, as described below in connection with FIG. 1B.

A user may request to download a given software program (to which he/she believes he/she has the rights to use) more than one time in order to install the software program on different computing devices. However, the actual use of the software upon installation is determined by further interactions with the software publication server 112, as described below in connection with FIG. 2.

Figure 1B:
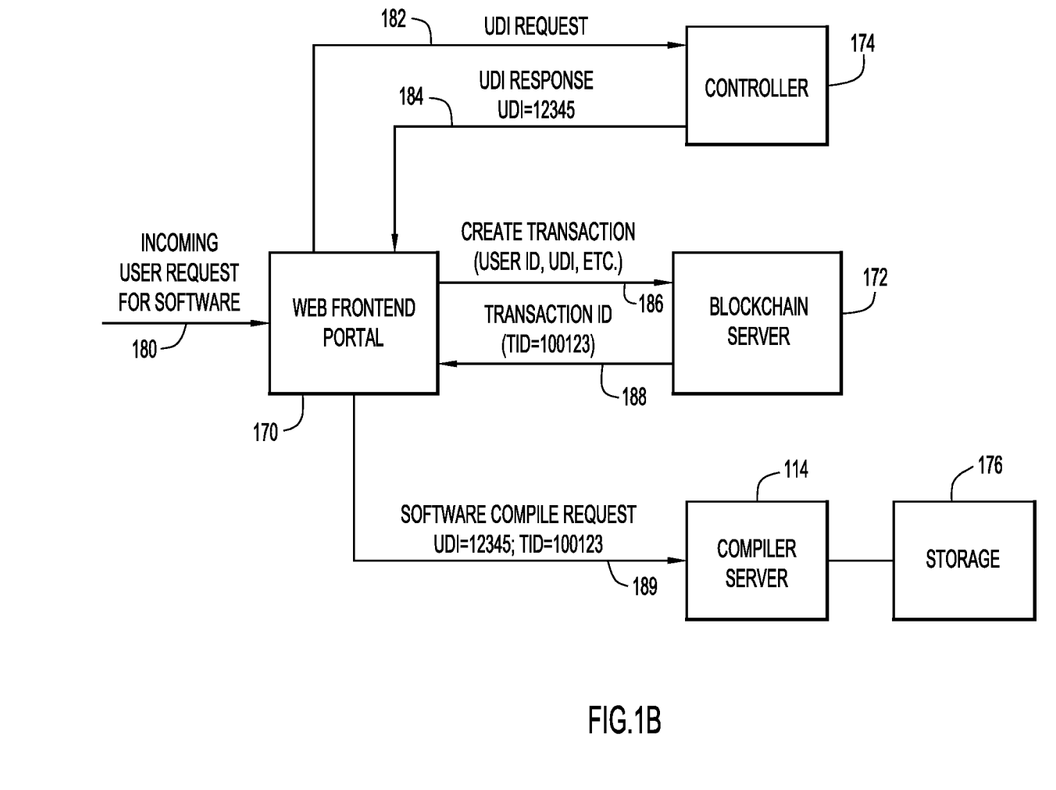

Turning to FIG. 1B, a diagram is shown, similar to FIG. 1A, for an operational flow of system 100 according to a further embodiment. In this diagram, the system 100 includes a web frontend portal 170, a blockchain server 172, a controller 174 and storage 176. The functions of web frontend portal 170, server 172 and controller 174 may be performed by one or more elements shown in FIG. 1B, such as the software publication server 112. In the example flow of FIG. 1B, an incoming user request for software is received at 180 at the portal 170. The portal sends a UDI request at 182 to the controller 174. The controller 174 generates a UDI (e.g., "12345") and sends a response with the UDI at 184 to the portal 170. The controller 174 may generate the UDI in a manner similar to that described above in connection with FIG. 1A.

Next, at 186, the portal 170 sends a command to the blockchain server 172 to create a transaction on the blockchain using the user-ID (or organization-ID, UDI, etc.). The blockchain server 172 creates a transaction on the blockchain and returns a transaction-ID (e.g., "100123") at 188. At 189, the portal 170 sends a software compile request that includes the UDI and the transaction-ID (TID) to the compiler server 114. The compiler server 114 compiles the software program along with the UDI and transaction-ID. In this manner, the compiled software includes (has embedded therein) the software UDI and transaction-ID and this is used after the compiled software is downloaded to a user's computing device, as described below in connection with FIG. 2.

Figure 2:
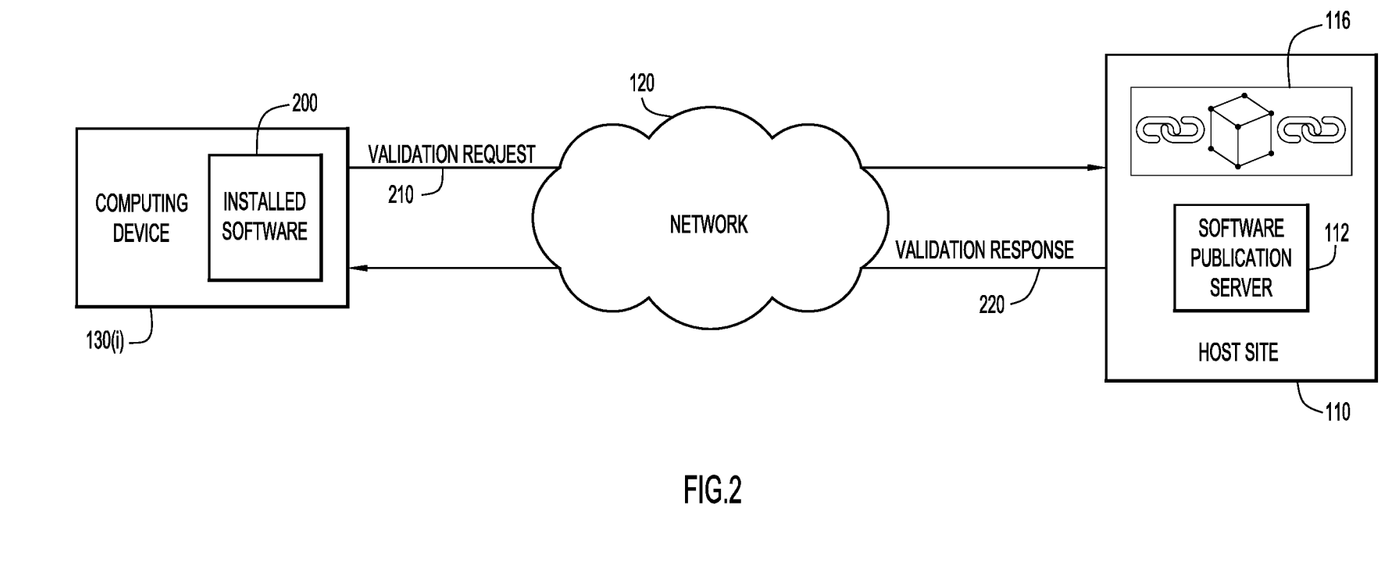
FIG. 2 is a diagram showing how the system validates an installation instance of software for use, according to an example embodiment.

Reference is now made to FIG. 2. Once the software 200 is first installed on a device 130(i), (whether for production usage or not), the software assumes demonstration/evaluation license mode and starts a default timer (e.g., 30 days). This timer value stays in non-volatile memory (e.g., non-volatile random access memory (NVRAM)) of the device so it is preserved during the reloads, etc. The device 130(i) attempts to communicate with the host (hosting the application), i.e., the vendor datacenter 110, that has access to the blockchain ledger 116 for that software program.

If device 130(i) cannot communicate with the host, then the software program stays in demonstration-use mode for the time-period, after which it ceases its activity to a bare minimum set of features. It continues its attempts to communicate, as expected, with a back-off timer.

If the device 130(i) can communicate with the vendor datacenter 110, then it sends a validation request as shown at 210. The validation request includes information obtained from the metadata included in the software 200 at download, including the software UDI, transaction-ID and additional information such as IP addresses, location (e.g., GPS coordinates), organization details etc. The software publication server 112 validates this information against the transaction-ID for the blockchain 116 associated with that software installed on device 130(i). If the request is validated, a unique transaction-ID is created (for another block of the blockchain 116) for the software instance and a validation flag is set. The result of a successful validation transaction (and block creation) enables the software 200 to learn about validation, duration (how long it is valid to operate), the features that are authorized/enabled for operation, etc. and activate them accordingly. The device 130(i) may also store that information for subsequent usage/validation.

The validation operation may also include checking/counting the number of transactions per block (with validation flag set) in a blockchain ledger for the specified organization to calculate how many instances of the software are active and whether that number is less than the maximum number of instances allowed. If that number is less than the allowed number of instances, then validation succeeds; otherwise, validation fails. Such a check could also be performed by any entity intending to validate the usage.

If the validation fails, then a transaction (transaction-ID) is created for the blockchain to reflect the validation being unsuccessful for the particular software instance, with the reason (e.g. no more instances allowed (maximum already met), no parent-id existing, organization mismatch etc.). The software instance on the device 130(i) will cease its activity to a bare minimum set of functions.

Figure 3:
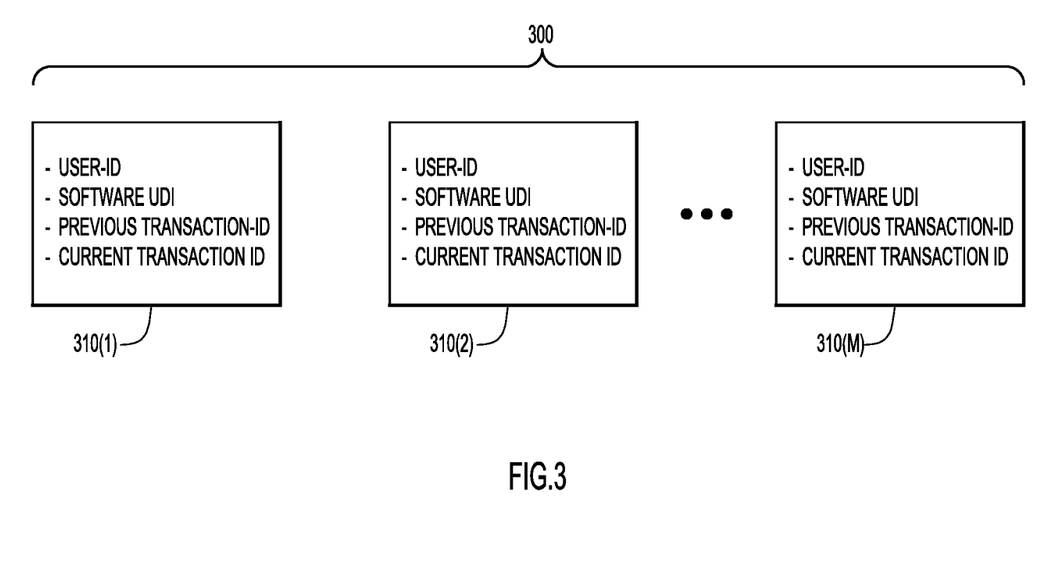
FIG. 3 is a diagram of a blockchain built up over time for monitoring usage of software, according to an example embodiment.

Reference is now made to FIG. 3. FIG. 3 shows an example of a blockchain 300 with transactions added to it over time after a particular software program is downloaded, and then subsequently installed on each of M devices. Reference is also made to FIGS. 1 and 2 for this description. Several transactions can occur at the same time, and then be validated as a "block," meaning a group of transactions are validated at the same time. Each transaction 310(1)-310(M)

includes the previous transaction-ID (creating the chain effect), the current transaction-ID, software UDI and User ID. A transaction may be created at operation 154 in FIG. 1A, and then another transaction is created when a user downloads the software. A transaction may further include organization-ID, production-usage flag, and copies allowed.

Next, a validation request is made when a device attempts to install/use the software, such as at boot-up of the device. If the validation request is granted, a transaction is created and a validation flag is set. For example, transaction 310(2) may be created at operations 210 and 220 in FIG. 2. Each time software is first installed on a device and the device is booted up after that installation, a validation request is made and it is determined whether the request can be granted, based on, for example, the number of installation copies allowed, etc. The validation flag is set each time a validation request is granted. Validation requests will be denied after the number of blocks with a validation flag set exceeds the number of allowed copies.

Figure 4:
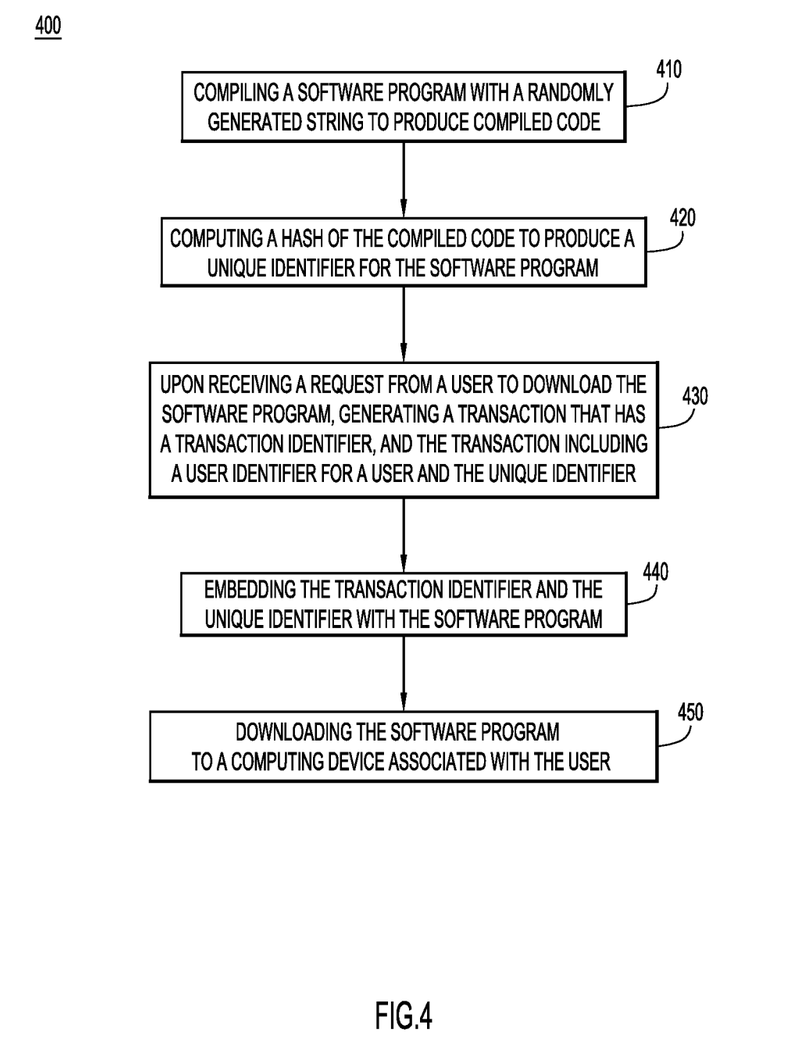
FIG. 4 is a flow chart of a process to monitor and control usage of software using a blockchain, according to an example embodiment.

Reference is now made to FIG. 4 for a description of a process 400 according to the techniques presented herein. This process is performed by a server for a software program to be distributed. At 410, the software program is compiled with a randomly generated string to produce compiled code. At 420, a hash of the compiled code is computed to produce a unique identifier for the software program. At 430, upon receiving a request from a user to download the software program, a transaction for a blockchain is generated. The transaction has a transaction identifier, and includes a user identifier for a user and the unique identifier. At 440, the transaction identifier (generated at 430) and the unique identifier are embedded with the software program. At 450, the software program is downloaded to a computing device associated with the user.

After operation 450, the installed software on a computing device needs to be validated before it can be used. To validate the software, the computing device on which the software is installed sends a validation request for the software program. The validation request includes transaction identifier and unique identifier information that was embedded with the software program. The validation request is received at the host site. The host site determines whether to validate the validation request, and sends a validation response to the computing device. If the validation request is to be validated, the host site generates a new transaction and an associated transaction identifier for the blockchain and setting a validation flag in the transaction block.

The validation request further includes one or more of: network address associated with the computing device, geographical location of the computing device, or information about a business enterprise of which the computing device or user is a part. Determining whether to validate includes examining a number of transactions with a validation flag that is set to determine whether a maximum number of copies of the software program have already been installed. Other information is also examined in the request, including user-ID, organization-ID, location, etc., to ensure that the request is from a device that is truly from a device on which the software program is expected to be installed (part of the organization that is authorized to use the software, in a geographic location where the organization has equipment, etc.).

If the validation request is to be granted, the host site generates a new transaction and an associated transaction identifier for the blockchain, and sets a validation flag in the new block. This generation of a new transaction with a validation flag set is performed for each validation of an installation instance of the software program such that there is a transaction having a validation flag set for each validated installation instance of the software program. This allows for user/administrator change the number of features (e.g. basic to advanced) on the portal at a later point of time. If it is determined that the validation set is set in a number of blocks that exceeds the maximum number of copies of the software, a transaction for the blockchain is generated that indicates that the validation request is denied due to the maximum number of copies of the software being exceeded.

Figure 5:
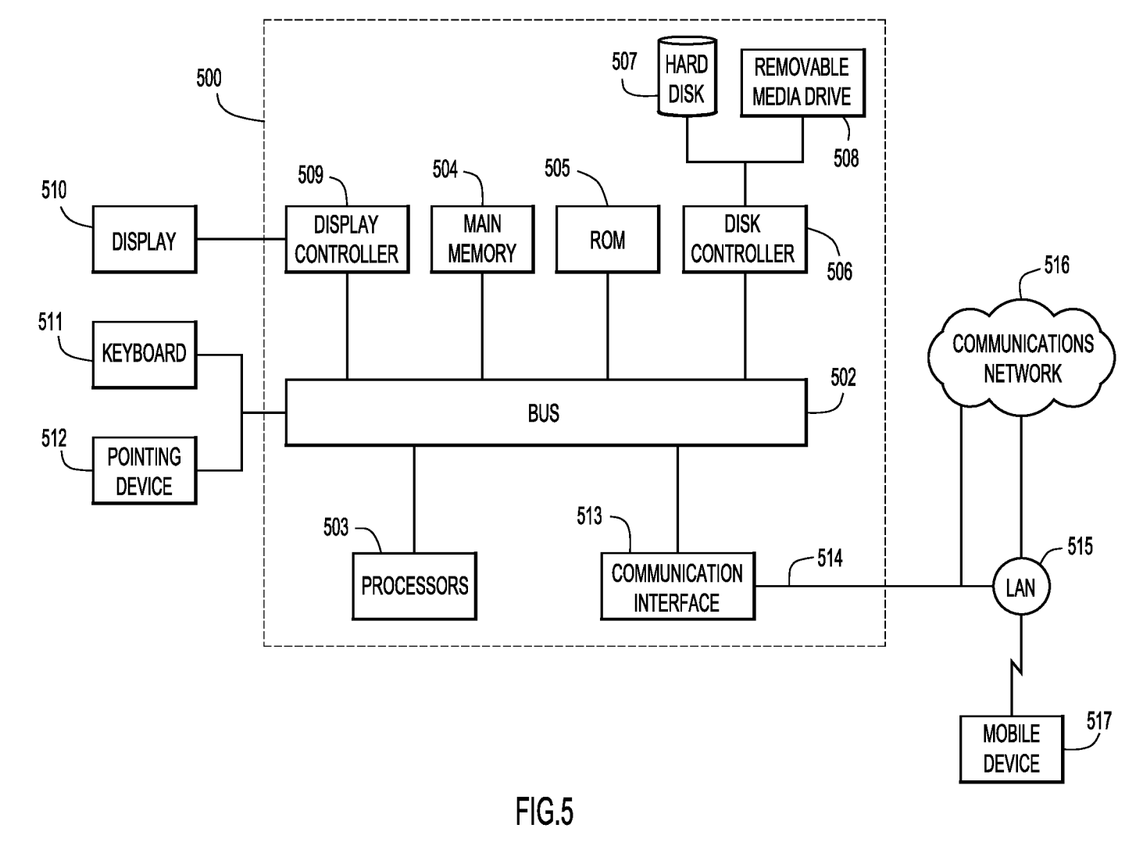
FIG. 5 is a block diagram of a server computer configured to monitor and control usage of software using a blockchain, according to an example embodiment.

Reference is now made to FIG. 5. FIG. 5 shows a block diagram of a computer system 500 upon which the embodiments presented may be implemented. The computer system 500 may be programmed to perform the operations for the software publication server 112, compiler server 114, blockchain server 172 and controller 174 described above in connection with FIGS. 1A, 1B and 2. The computer system 500 includes a bus 502 or other communication mechanism for communicating data within the device, and a processor 503 coupled with the bus 502 for processing the information. While the figure shows a single block 503 for a processor, it should be understood that the processors 503 represent a plurality of processing cores, each of which can perform separate processing. The computer system 500 also includes a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions to be executed by processor 503. In addition, the main memory 504 may be used for storing temporary variables or other intermediate information during the execution of instructions by the processor 503. For example, the main memory 504 would store software instructions executed by the one or more processors 503 to perform the operations described above in connection with FIGS. 1A, 1B, and 2-4, and the main memory would also store the blockchain data that is built up over time as usage activity associated with a software program occur.

The computer system 500 further includes a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 500 may also include a disk controller 506 coupled to the bus 502 to control one or more storage devices for storing information and instructions, such as a magnetic hard disk 507 or solid-state storage, and a removable media drive 508 (e.g., floppy disk drive, read-only compact disc drive, read/write compact disc drive, compact disc jukebox, tape drive, optical drive). The storage devices may be added to the computer system 500 using an appropriate device interface (e.g., small computer system interface (SCSI), integrated device electronics (IDE), enhanced-IDE (E-IDE), direct memory access (DMA), or ultra-DMA), or any other technology now known or hereinafter developed.

The computer system 500 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 500 may also include a display controller 509 coupled to the bus 502 to control a display 510, such as a Liquid Crystal Display (LCD), Light Emitting Diode (LED) display or other now known or hereinafter developed display technologies, for displaying information to a computer user. The computer system 500 includes input devices, such as a keyboard 511 and a pointing device 512, for interacting with a computer user and providing information to the processor 503. The pointing device 512, for example, may be a mouse, a trackball, or a pointing stick, touch-pad for communicating direction information and command selections to the processor 503 and for controlling cursor movement on the display 510. The display 510 may be a touch-screen display in one example.

The computer system 500 performs a portion or all of the processing steps of the process in response to the processor 503 executing one or more sequences of one or more instructions contained in a memory, such as the main memory 504. Such instructions may be read into the main memory 504 from another computer readable medium, such as a hard disk 507 or solid state storage or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 500 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 500, for driving a device or devices for implementing the process, and for enabling the computer system 500 to interact with a human user. Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 500 also includes a communication interface 513 coupled to the bus 502. The communication interface 513 provides a two-way data communication coupling to a network link 514 that is connected to, for example, a local area network (LAN) 515, or to another communications network 516 such as the Internet. For example, the communication interface 513 may be a wired or wireless network interface card to attach to any packet switched (wired or wireless) LAN. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local area network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc.). The computer system 500 can transmit and receive data, including program code, through the network(s) 515 and 516, the network link 514 and the communication interface 513. Moreover, the network link 514 may provide a connection through a LAN 515 to a mobile device 517 such as a personal digital assistant (PDA) laptop computer, tablet computer, or cellular telephone.

In summary, presented herein are techniques to encode transaction-ID into a software program and use it for validation of usage of the software program.

Each software instance is uniquely identified. The software program is compiled each time a user tries to download the software program. A new hashing is created which is embedded in the software program. When the software is downloaded, information about the intended use of the software (customer identity, coordinator details) is updated in the blockchain, and the transaction-ID is embedded in the software. When the software is installed, it sends a user ID and transaction-ID for validation. Once the software is validated, additional details about the use of the software is stored as a new block/node in the blockchain.

These techniques greatly improve the technology of software usage management and control. Blockchain is leveraged for inventory management and integrity validation. These techniques scale for any enterprise and/or service provider customers. Tamper-proof licensing is achieved, and there is no need to deal with license keys. The software assets cannot be used by people not registered with the software vendor/distributor.

Every transaction is cryptographically secure and cannot be modified. This creates trust in several areas: prevents the software distributor from accidentally corrupting or mishandling data; making the data in the blockchain transparent (publicly available in a known way); providing robust fault and tamper resistant data; creating visibility for the software owner/creator into asset chain of custody of assets, including technical details, thereby improving service capabilities.

The techniques presented herein involve compiling an entropy bit into the software itself, as a method of software serialization. This makes every copy of the software unique. A hash of the unique software is stored on the blockchain. In effect, there is no license key, because the entire piece of software is unique. Furthermore, by taking a hash of the entire software as described in accordance with the techniques presented herein, one can detect and track or prevent tampering with the software itself. By contrast, if only the license key is tracked (as with conventional techniques), then someone might use the key to access the software, and then hack the software to do something else.

In one form, a method is provided including: at a server, for a software program to be distributed: compiling the software program with a randomly generated string to produce compiled code; computing a hash of the compiled code to produce a unique identifier for the software program; upon receiving a request from a user to download the software program, generating a blockchain transaction for a blockchain, the transaction having a transaction identifier and the transaction including a user identifier for the user and the unique identifier; embedding the transaction identifier and the unique identifier with the software program; and downloading the software program to a computing device associated with the user.

In another form, an apparatus is provided including: a communication interface configured to enable communications over a network; one or more processors coupled to the communications interface, the one or more processors configured to: compile a software program with a randomly generated string to produce compiled code; compute a hash of the compiled code to produce a unique identifier for the software program; upon receiving a request from a user to download the software program, generate a transaction for a blockchain that has a transaction identifier and the transaction including a user identifier for the user and the unique identifier; embed the transaction identifier and the unique identifier with the software program; and download the software program to a computing device associated with the user.

In still another form, one or more non-transitory computer readable storage media are provided encoded with software comprising computer executable instructions and when the software is executed operable to perform operations comprising: compiling a software program with a randomly generated string to produce compiled code; computing a hash of the compiled code to produce a unique identifier for the software program; upon receiving a request from a user to download the software program, generating a transaction for a blockchain, the transaction having a transaction identifier and the transaction including a user identifier for the user and the unique identifier; embedding the transaction identifier and the unique identifier with the software program; and downloading the software program to a computing device associated with the user.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a server, for a copy of a software program among a plurality of copies of the software program to be distributed:
   compiling the copy of the software program with a randomly generated string that is unique to the copy of the software program to produce compiled code;
   computing a hash of the compiled code to produce a unique identifier for the copy of the software program;
   upon obtaining a request from a user to download the copy of the software program, generating a transaction for a blockchain, the transaction having a transaction identifier and the transaction including a user identifier for the user and the unique identifier;
   embedding the transaction identifier and the unique identifier with the copy of the software program; and
   downloading the copy of the software program to a computing device associated with the user.

2. The method of claim 1, further comprising:
   obtaining from the computing device a validation request for the copy of the software program, the validation request including information obtained from the copy of the software program, including the unique identifier and the transaction identifier;
   determining whether to validate the validation request; and
   providing a validation response to the computing device based on the determining.

3. The method of claim 2, wherein if the validation request is to be validated, further comprising:
   generating a new transaction and an associated transaction identifier for the blockchain and setting a validation flag in a transaction block.

4. The method of claim 3, wherein the generating the new transaction is performed for each validation of an installation instance of the copy of the software program such that there is a transaction having a validation flag set in the blockchain for each validated installation instance of the copy of the software program.

5. The method of claim 4, wherein the determining whether to validate includes examining a number of transactions with the validation flag to determine whether a maximum number of the plurality of copies of the software program have already been installed.

6. The method of claim 5, wherein if it is determined that the validation flag is set in a number of transactions that exceeds the maximum number of the plurality of copies of the software program, further comprising generating a transaction for the blockchain that indicates that the validation request is denied due to the maximum number of the plurality of copies of the software program being exceeded.

7. The method of claim 2, wherein the validation request further includes one or more of: network address associated with the computing device, geographical location of the computing device, or information about a business enterprise of which the computing device or user is a part.

8. The method of claim 7, wherein generating another transaction for the blockchain comprises including an identifier of the business enterprise, a descriptor of the software program, and a maximum number of the plurality of copies of the software program that the user is permitted to install.

9. An apparatus comprising:
   a communication interface configured to enable communications over a network; and
   one or more processors coupled to the communications interface, the one or more processors configured to, for a copy of a software program among a plurality of copies of the software program to be distributed:
   compile the copy of the software program with a randomly generated string that is unique to the copy of the software program to produce compiled code;
   compute a hash of the compiled code to produce a unique identifier for the copy of the software program;
   upon obtaining a request from a user to download the copy of the software program, generate a transaction for a blockchain, the transaction having a transaction identifier and the transaction including a user identifier for the user and the unique identifier;
   embed the transaction identifier and the unique identifier with the copy of the software program; and
   download the copy of the software program to a computing device associated with the user.

10. The apparatus of claim 9, wherein the one or more processors are configured to:
  obtain from the computing device a validation request for the copy of the software program, the validation request including information obtained from the copy of the software program, including the unique identifier and the transaction identifier;
  determine whether to validate the validation request; and
  provide a validation response to the computing device based on whether the validation request is validated.

11. The apparatus of claim 10, wherein if the validation request is to be validated, the one or more processors are configured to:
  generate a new transaction and an associated transaction identifier for the blockchain and setting a validation flag in a transaction block.

12. The apparatus of claim 11, wherein the one or more processors are configured to:
  generate the new transaction for each validation of an installation instance of the copy of the software program such that there is a transaction having a validation flag set in the blockchain for each validated installation instance of the copy of the software program.

13. The apparatus of claim 12, wherein the one or more processors are configured to:
  examine a number of transactions with the validation flag to determine whether a maximum number of the plurality of copies of the software program have already been installed.

14. The apparatus of claim 13, wherein the one or more processors are configured to:
  generate a transaction that indicates that the validation request is denied due to the maximum number of the plurality of copies of the software program being exceeded if it is determined that the validation flag is set in a number of transactions that exceeds the maximum number of the plurality of copies of the software program.

15. The apparatus of claim 10, wherein the validation request further includes one or more of: network address associated with the computing device, geographical location of the computing device, or information about a business enterprise of which the computing device or user is a part.

16. One or more non-transitory computer readable storage media encoded with software comprising computer executable instructions and when the software is executed operable to perform operations comprising, for a copy of a software program among a plurality of copies of the software program to be distributed:
  compiling the copy of the software program with a randomly generated string that is unique to the copy of the software program to produce compiled code;
  computing a hash of the compiled code to produce a unique identifier for the copy of the software program;
  upon obtaining a request from a user to download the copy of the software program, generating a transaction for a blockchain, the transaction having a transaction identifier and the transaction including a user identifier for the user and the unique identifier;
  embedding the transaction identifier and the unique identifier with the copy of the software program; and
  downloading the copy of the software program to a computing device associated with the user.

17. The one or more non-transitory computer readable storage media of claim 16, further comprising instructions operable for:
  obtaining from the computing device a validation request for the copy of the software program, the validation request including information obtained from the copy of the software program, including the unique identifier and the transaction identifier;
  determining whether to validate the validation request; and
  providing a validation response to the computing device based on whether the validation request is validated.

18. The one or more non-transitory computer readable storage media of claim 17, wherein if the validation request is to be validated, further comprising instructions operable for:
  generating a new transaction and an associated transaction identifier for the blockchain and setting a validation flag in a transaction block.

19. The one or more non-transitory computer readable storage media of claim 18, wherein the instructions operable for generating the new transaction are performed for each validation of an installation instance of the copy of the software program such that there is a transaction having a validation flag set in the blockchain for each validated installation instance of the copy of the software program.

20. The one or more non-transitory computer readable storage media of claim 19, wherein the instructions operable for determining include instructions operable for examining a number of transactions with the validation flag to determine whether a maximum number of the plurality of copies of the software program have already been installed.

* * * * *